(12) United States Patent
Sunaga et al.

(10) Patent No.: US 6,871,434 B2
(45) Date of Patent: Mar. 29, 2005

(54) INDICATOR

(75) Inventors: Sumiko Sunaga, Saitama (JP); Takeshi Nakazawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/394,023

(22) Filed: Mar. 24, 2003

(65) Prior Publication Data

US 2003/0226494 A1 Dec. 11, 2003

(30) Foreign Application Priority Data

Mar. 25, 2002 (JP) ........................................ 2002-083241

(51) Int. Cl.⁷ .............................................. G09F 21/04
(52) U.S. Cl. .............................. 40/593; 40/564; 40/580; 362/489; D12/192
(58) Field of Search ........................... 40/593, 564, 581, 40/580; 362/482, 489; 73/866.3; D12/192; 248/27.1

(56) References Cited

U.S. PATENT DOCUMENTS

| | | | | |
|---|---|---|---|---|
| 736,722 A | * | 8/1903 | Hall ............................ | 40/580 |
| 2,152,845 A | * | 4/1939 | Hays ........................... | 40/577 |
| 5,282,330 A | * | 2/1994 | Hannula ....................... | 40/552 |
| 5,992,068 A | * | 11/1999 | de Saro ....................... | 40/564 |
| 6,066,225 A | * | 5/2000 | Lopes ......................... | 362/489 |

FOREIGN PATENT DOCUMENTS

| | | |
|---|---|---|
| JP | 10-240142 A | 9/1998 |
| JP | 11-51709 A | 2/1999 |
| JP | 2001-81738 A | 3/2001 |

* cited by examiner

*Primary Examiner*—Gary C. Hoge
(74) *Attorney, Agent, or Firm*—Birch, Stewart, Kolasch & Birch, LLP

(57) ABSTRACT

An indicator including a transmittable indicator panel attached to a shielding holder (a housing), and a character or a graphic form indicated inside the indicator panel. The character or the graphic form is irradiated by a light emitting diode located inside the housing. The indicator panel is formed by a character indicating part that indicates a character or a graphic form and transmits light, a masking part that intercepts light by surrounding the character indicating part, and a transmittable margin that surrounds the masking part and transmits light. With this configuration, a character or a graphic form becomes conspicuous during the daytime, and at night is never more conspicuous than is required. Thus, the visibility of the indicator can be improved. Moreover, the configuration of the transmitting light from the light source of the indicator allows it to be accommodated in the limited space available on the indicator panel.

18 Claims, 9 Drawing Sheets

Example for Comparison

Embodiment

INDICATOR

CROSS-REFERENCE TO RELATED APPLICATION

The present application claims priority under 35 U.S.C. §119 to Japanese Patent Application No. 2002-083241, filed Mar. 25, 2002, the entire contents of which are hereby incorporated by reference.

BACKGROUND OF THE INVENTION

1. Field of the Invention

The present invention relates to an indicator in which a transmittable indicator panel is attached to a housing, indicates a character or a graphic form and the character or the graphic form is lighted by a light source provided in the housing.

2. Description of Background Art

FIGS. 9(a) and 9(b) are explanatory drawings for explaining a conventional type indicator, FIG. 9(a) being a front view and FIG. 9(b) being a side sectional view.

As shown in FIG. 9(a), the conventional type indicator 210 is an indicator in which a translucent indication area 212 is formed in an indicator panel 211. An indicated character 213 that does not transmit light is printed on the indication area 212. As shown in FIG. 9(b), the indicator panel 211 is lighted from the back by a light emitting diode 214, and the indicated character 213 can be also read at night by transmitting light from the light emitting diode 214.

Examples of attempted improvements to make indicator 210 clearer are shown in 1) "Light emitting diode bulb-type indicator" disclosed in Japanese published unexamined patent application No. Hei10-240142, and 2) "Indicator" disclosed in Japanese published unexamined patent application No. Hei11-51709.

In above 1), as shown in FIGS. 3 and 4 in the patent application, a board 37 is attached to a cup-shaped base 36 (a reference number used in the patent application is used as it is). A light emitting diode bulb 38 is attached to the board 37, an inner lens 21 collectively covers the board 37 and the light emitting diode bulb 38, and a concave portion 41 for widening the optical axis of the light emitting diode bulb 38 is formed in the inner lens 21. The indicator is prevented from being highlighted more than required at night by diffusing the quantity of light emitted from the light emitting diode bulb 38.

In above 2), as shown in FIG. 1 in the patent application, the improvement of the visibility of the following indication area S is attempted by attaching a light emitting diode (LED) 13 to a printed wiring board 4, covering the circumference of LED 13 with a case 1, and putting an indicator panel 6 on the case 1. An indication area S including a translucent layer 14 and a colored layer 15 is provided to the indicator panel 6, and the remaining area except the indication area S is masked with an opaque ground-color layer 9.

However, in the light emitting diode bulb-type indicator in the above 1), even though the indicator can be prevented from being highlighted more than required at night by diffusing the quantity of light emitted from the light emitting diode bulb 38, an indicated character cannot be always made clear.

In addition, in the indicator in the above 2), even though the visibility of the indication area S can be improved by masking the area except for the indication area S with the opaque ground-color layer 9, the colored layer 15 (the indicated character) is not always clear.

That is, an indicator that can indicate a character or a graphic form clearly both in the daytime and at night is desired.

SUMMARY AND OBJECTS OF THE INVENTION

The object of the present invention is to provide technique that can indicate a character or a graphic form clearly both in the daytime and at night and can improve the visibility of an indicator.

To achieve the object, according to a first aspect of the invention, an indicator of a type that an indicator panel that can transmit light is attached to a housing. The indicator indicates a character or a graphic form and the character or the graphic form which is irradiated by a light source provided in the housing. The indicator panel includes a character indicating part that indicates a character or a graphic form and transmits light, a masking part that intercepts light by surrounding the character indicating part and a transmittable margin that surrounds the masking part and transmits light.

It is desirable that the indicator that irradiates the character or the graphic form by the light source provided in the housing can indicate it clearly both in the daytime and at night.

With conventional indicators, in the daytime, light from a light source is likely to be hardly conspicuous, whereas at night the light often seems too strong. However, with the device of the present invention, the area of a part that transmits light from the light source in the indicator panel is limited by forming the indicator panel by the character indicating part that indicates the character or the graphic form and transmits the light, the masking part that intercepts the light by surrounding the character indicating part, and the transmittable margin that surrounds the masking part and transmits the light. As a result, in the daytime, the character or the graphic form inside the indicator panel is conspicuous, and at night, it is never more conspicuous than required. Thus, the visibility of the indicator can be improved, both during the day and at night.

According to a second aspect of the present invention, the indicator includes a mat face for softening light to be transmitted to the back of a character indicating part, and a diamond-cut face or a crystal face for increasing brightness by irregularly reflecting light to be transmitted to the back of a transmittable margin.

The character indicating part that indicates the character or the graphic form can be made conspicuous by providing the mat face for softening the light to be transmitted to the back of the character indicating part. In addition, the character or the graphic form can be accented by providing the diamond-cut face or the crystal face for increasing brightness by irregularly reflecting the light to be transmitted to the back of the transmittable margin. As a result, the design of the indicator can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the attached drawings, embodiments of the invention will be described below. The front, the rear, the right, the left, the upside and the downside mean each position viewed from a rider, "Fr" means "frontward", "Rr" means "rearward", "R" means "rightward" and "L" means "leftward", which are respectively shown in FIG. 1. The drawings shall be viewed in the direction of their reference numbers.

Figure 1:
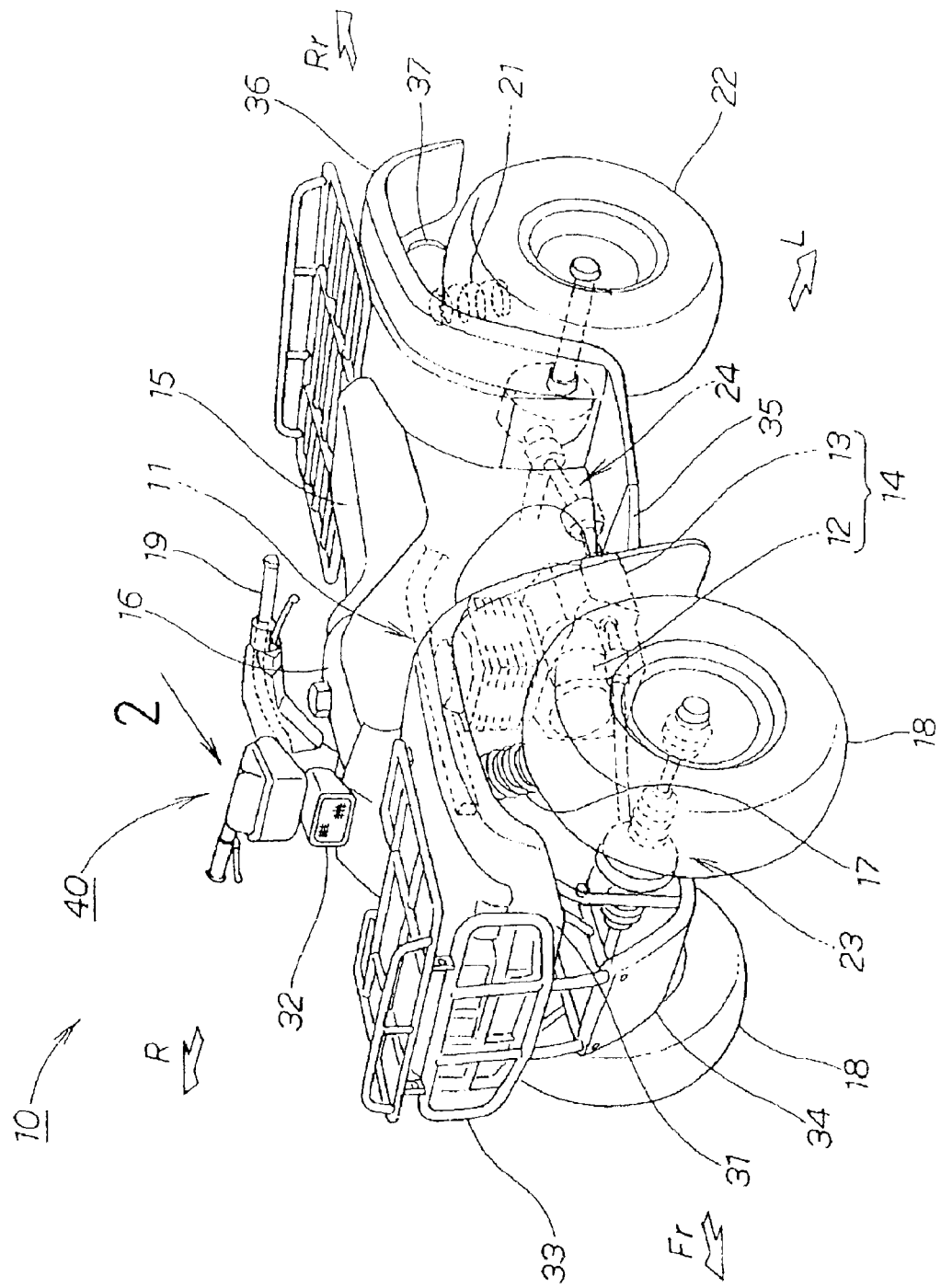
FIG. 1 is a perspective view showing a saddle-type vehicle mounting an indicator according to the invention.

FIG. 1 is a perspective view showing a saddle-type vehicle on which an indicator according to the invention is mounted. The saddle-type vehicle 10 includes a body frame 11, a power unit 14 including an engine 12 mounted in the center of the body fame 11 and a transmission 13, a saddle-type seat 15 provided above the power unit 14, a fuel tank 16 arranged in front of the saddle-type seat 15, and front wheels 18, 18 attached to the sides of the front of the body frame 11 via right and left suspension mechanisms 17, 17 (the inside suspension mechanism 17 is not shown) so that the front wheels can be rotated, a handlebar 19 being provided for steering front wheels 18, 18. Also included are rear wheels 22, 22 (the inside rear wheel 22 is not shown) attached to the sides of the rear of the body frame 11 via right and left suspension mechanisms 21, 21 (the inside suspension mechanism 21 is not shown) so that the rear wheels can be rotated, a front motive power transmission mechanism 23 that transmits the rotation of the engine 12 to the front wheels 18, 18 and a rear motive power transmission mechanism 24 that transmits the rotation of the engine 12 to the rear wheels 22, 22.

Also shown is a front fender 31, a headlamp 32, a front bumper 33, an undercover 34, a floor step 35, a rear fender 36, and a muffler 37.

The saddle-type vehicle 10 is a four-wheel drive buggy and is a vehicle classified as an all terrain vehicle. Since the saddle-type vehicle has a light and compact body, has a small turning circle, and has satisfactory operability, it is a vehicle which is suitable for dedicated, off-road use, such as for movement in agriculture, stock raising, hunting, a safety patrol, as well as for leisure off-road traveling.

Figure 2:
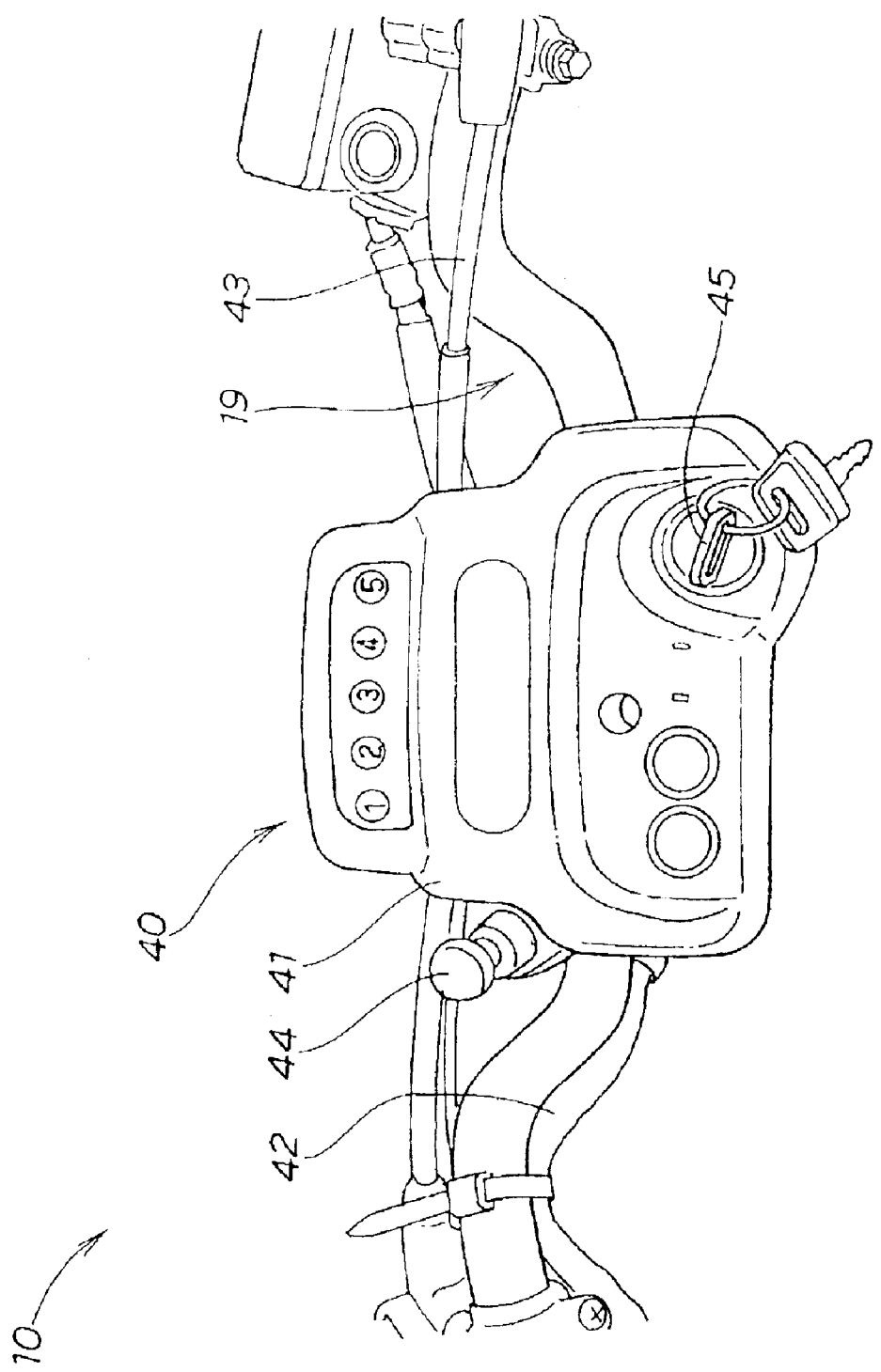
FIG. 2 is a view viewed from an arrow 2 in FIG. 1.

FIG. 2 is a perspective view viewed from a direction shown by an arrow 2 in FIG. 1. The indicator of the present invention is supported by the vehicle meter 40, which in turn is mounted on the handlebar 19.

FIG. 2 also shows an operation box 41 arranged in the center of the handlebar 19, a handlebar switch cord 42 connected to a handlebar switch (not shown), a throttle cable 43 for remotely operating a throttle (not shown), a choke knob 44 pulled when the engine 12 (see FIG. 1) is started, and an engine key 45 for starting the engine 12.

Figure 3:
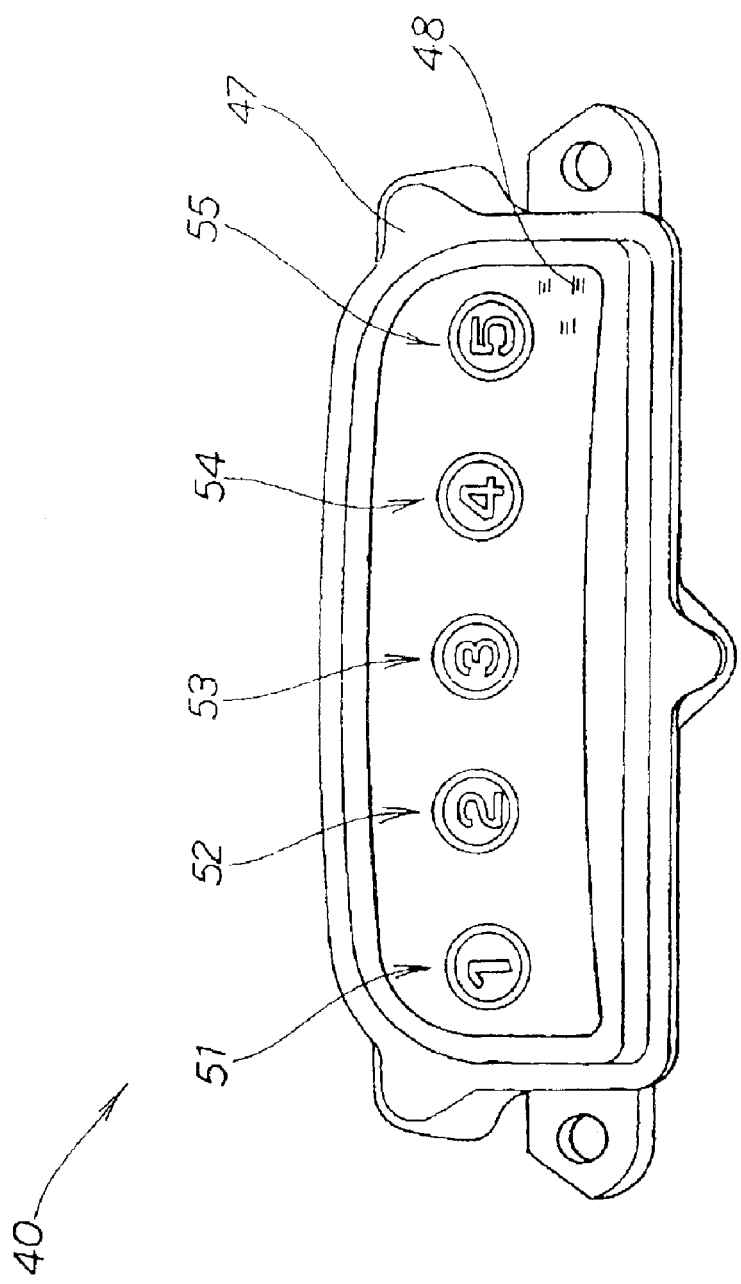
FIG. 3 is a front view showing a vehicular meter adopting the indicator according to the invention.

FIG. 3 is a front view showing the vehicular meter adopting the indicator according to the invention. The vehicular meter 40 is composed of a meter housing 47 attached to the upside of the operation box 41 (see FIG. 2), a transparent cover 48 covering the meter housing 47 and indicators 51 to 55 housed in the meter housing 47 and the transparent cover 48 for indicating a shift position as an indicator that indicates the gear position of the transmission 13 (see FIG. 1).

These indicators 51 to 55 for indicating a shift position have the same structure, however, have different characters and for one example, the structure of an indicator 50 having a character D will be described below.

Figure 4A:
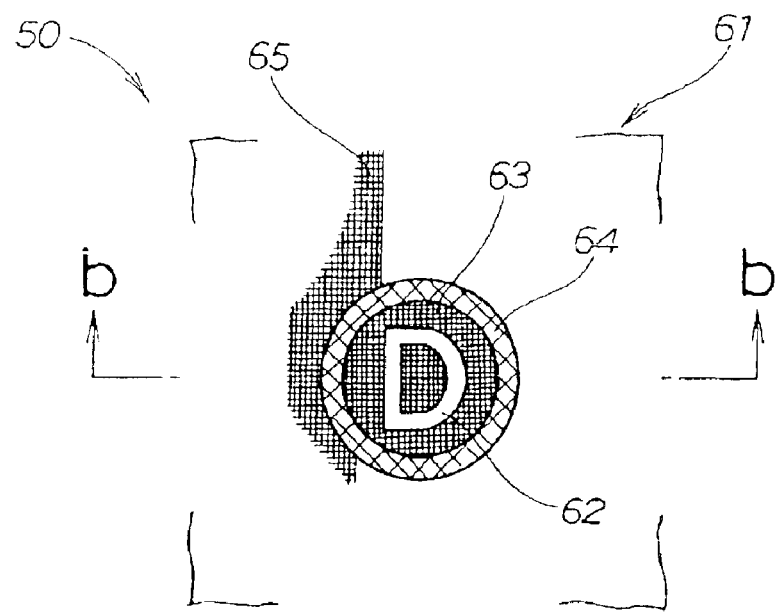
FIGS. 4(a) and (b) are explanatory drawings for explaining the indicator according to the invention.
Figure 4B:
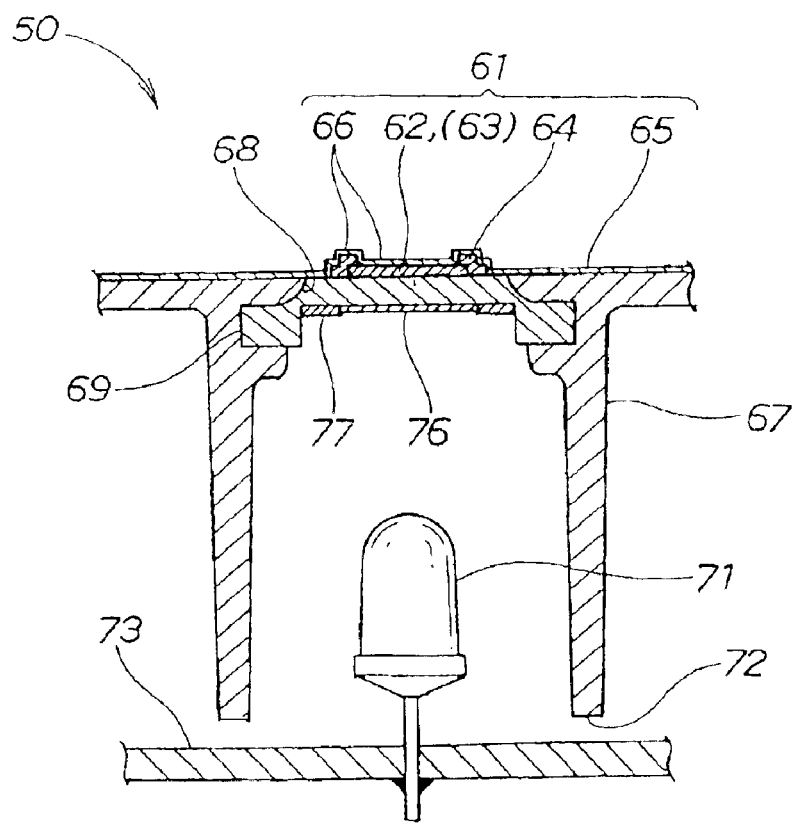

FIGS. 4(a) and 4(b) explain the indicator according to the invention. FIG. 4(a) is a front view showing the indicator 50, and FIG. 4(b) is a sectional view viewed along a line b—b in FIG. 4(a).

As shown in FIG. 4(a), the indicator 50 is provided with a character indicating part 62 that indicates the character D and transmits light, a masking part 63 that intercepts light by surrounding the character indicating part 62, and a transmittable margin 64 that surrounds the masking part 63 and transmits light respectively on an indicator panel 61.

FIG. 4(a) also shows a peripheral area 65 in the indicator panel 61. The peripheral area 65 is a part that intercepts light by printing so that the part is solid in black, and is equivalent to a partition between two of the indicators 51 to 55 shown in FIG. 3.

As shown in FIG. 4(b), a shielding holder 67 is arranged under the indicator panel 61. The shielding holder 67 serves and a housing, or inside structure of the indicator 50. A light transmitting plate 69 is attached to an opening 68 on the upper surface of the shielding holder 67. A light emitting diode 71 as a light source that irradiates the light transmitting plate 69 is housed in the shielding holder 67, and a board 73 that supports the light emitting diode 71 is arranged in an opening 72 of the lower surface of the shielding holder 67. Also shown is a transmittable area 66 of the indicator panel 61.

As shown in FIG. 4(b), a mat face 76 is provided for softening light transmitted to the character indicating part 62 by forming the mat on the back of the light transmitting plate 69. A diamond-cut face 77 is provided for irregularly reflecting light to be transmitted to the back of the transmittable margin 64 so that brightness is increased by forming the diamond-cut face on the back of the light transmitting plate 69.

That is, the indicator 50 is based upon the indicator of the type that the indicator panel 61 that can transmit light is attached to the shielding holder (the housing) 67. The indicator 50 indicates a character or a graphic form and the character or the graphic form is irradiated by the light emitting diode 71 (a light source) provided in the shielding holder (the housing) 67. The indicator panel 61 includes the character indicating part 62 that indicates the character or the graphic form and transmits light, the masking part 63 that intercepts light by surrounding the character indicating part 62, and the transmittable margin 64 that surrounds the masking part 63 and transmits light.

It is desirable that the indicator 50 for irradiating the character or the graphic form by the light emitting diode 71 (the light source) be able to indicate the character or the graphic form clearly both in the daytime and at night.

With conventional indicators, in the daytime, it is likely that a light from a light source may be hardly conspicuous, while at night, it is likely that the light may seem too strong. However, with the configuration of the present invention, the area of a part that transmits light from the light emitting diode 71 (the light source) in the indicator panel 61 is limited by forming the indicator panel 61 by the character indicating part 62 that indicates a character or a graphic form and transmits the light, the masking part 63 that intercepts the light by surrounding the character indicating part 62, and the transmittable margin 64 that surrounds the masking part 63 and transmits the light.

Hereby, the character or the graphic form inside the indicator panel 61 is conspicuous in the daytime, and at night is kept from being more conspicuous than required. As a result, the visibility of the indicator 50 can be improved.

It may be also said that the indicator 50 is provided with the mat face 76 for softening light to be transmitted to the back of the character indicating part 62, and the diamond-cut face 77 for increasing brightness by irregularly reflecting light to be transmitted to the back of the transmittable margin 64.

The character indicating part 62 that indicates the character or the graphic form can be made conspicuous by providing the mat face 76 for softening light to be transmitted to the back of the character indicating part 62, and the character or the graphic form can be accented by providing the diamond-cut face 77 for irregularly reflecting light to be transmitted to the back of the transmittable margin 64 and increasing brightness. As a result, the design of the indicator can be enhanced.

The action of the indicator 50 described above will be described below.

Figure 5A:
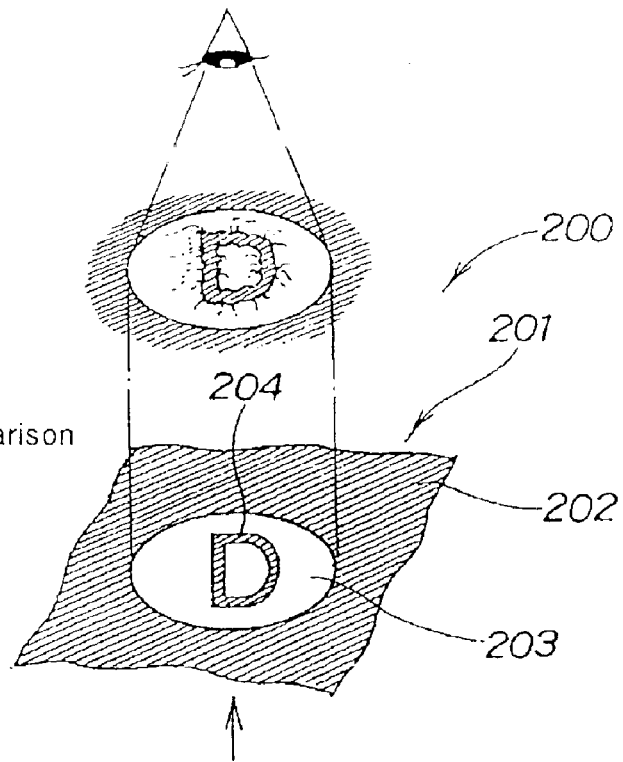
FIGS. 5(a) and (b) are explanatory drawings for explaining the action of the indicator according to the invention.
Figure 5B:
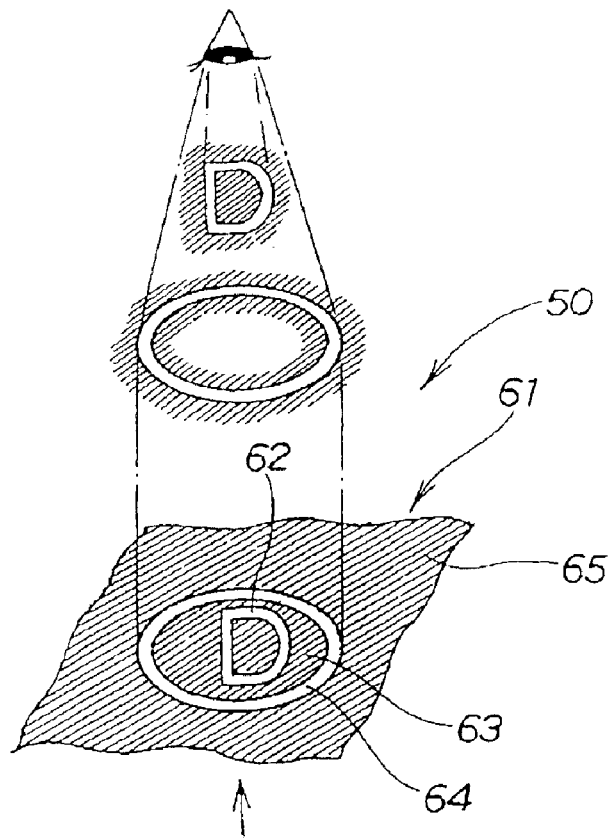

FIGS. 5(*a*) and 5(*b*) are explanatory drawings for explaining the action of the indicator according to the invention. FIG. 5(*a*) shows an indicator 200 in an example for comparison, and FIG. 5(*b*) shows the indicator 50 equivalent to an embodiment.

As shown in FIG. 5(*a*), the indicator 200 is an indicator in which a peripheral area 202 that does not transmit light is formed by printing so that an indicator panel 201 is solid in black, a light transmitting part 203 that transmits light is formed inside the peripheral area 202, and a character indicating part 204 that does not transmit light is formed in the light transmitting part 203.

However, as a great deal of light is transmitted in the light transmitting part 203 in the indicator 200, the light irradiates the character indicating part 204, when the character indicating part 204 is viewed, for example, in the evening, the character indicating part 204 cannot be clearly recognized or at night, the light transmitting part 203 is sometimes felt too glaring. That is, it is desirable that the character indicating part 204 can be clearly recognized both in the daytime and at night.

As shown in FIG. 5(*b*), in the indicator 50, the area of the part that transits light from the light emitting diode 71 (the light source) in the indicator panel 61 is limited by forming the indicator panel 61 by the character indicating part 62 that indicates the character or the graphic form and transmits the light, the masking part 63 that intercepts the light by surrounding the character indicating part 62, and the transmittable margin 64 that surrounds the masking part 63 and transmits the light.

Hereby, in the daytime, the character or the graphic form inside the indicator panel 61 is conspicuous and at night, it is never more conspicuous than required. As a result, the visibility of the indicator 50 can be improved.

Figure 6A:
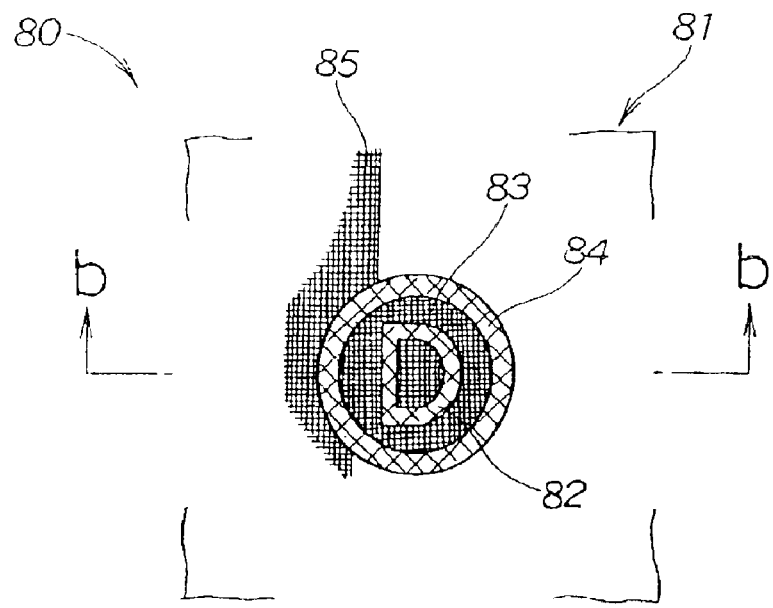
FIGS. 6(a) and (b) are explanatory drawings for explaining an indicator equivalent to another embodiment of the invention.
Figure 6B:
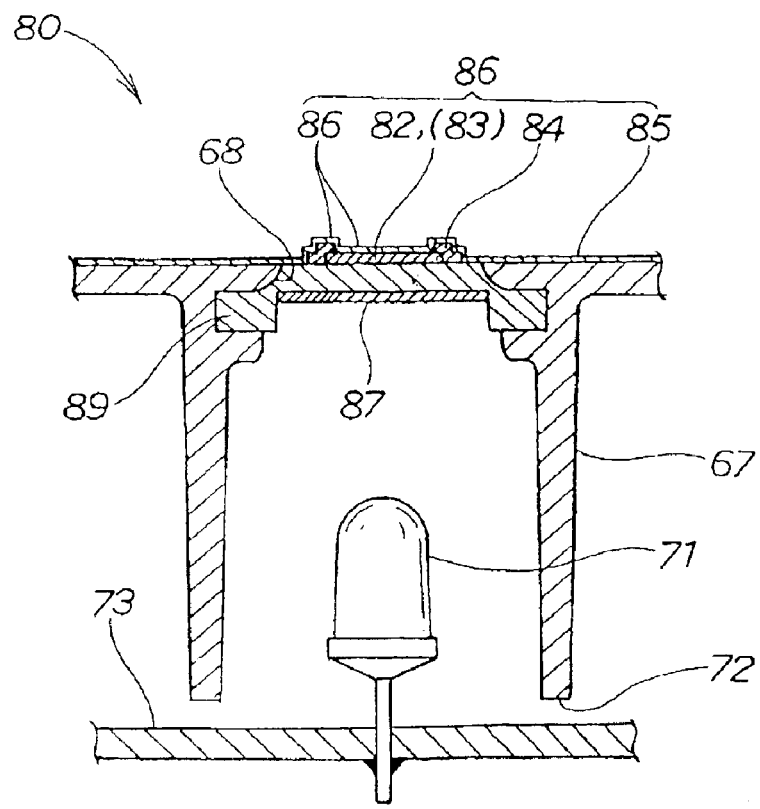

FIGS. 6(*a*) and (*b*) are explanatory drawings for explaining an indicator equivalent to another embodiment of the invention. FIG. 6(*a*) is a front view showing the indicator 80, and FIG. 6(*b*) is a sectional view viewed along a line b—b in FIG. 6(*a*). The same reference number is allocated to the same component as the component used in the indicator 50 (see FIG. 4) and the detailed description is omitted.

FIG. 6(*a*) shows an indicator panel 81, a character indicating part 82, a masking part 83, a transmittable margin 84, a peripheral area 85. FIG. 6(*b*) shows a light transmitting area 86, a diamond-cut face 87, a light transmitting plate 88. Indicator 80 is provided with the diamond-cut face 87 in the character indicating part 82, and the transmittable margin 84. That is, the indicator 80 can be differentiated from the other indicators 51 to 55 shown in FIG. 3, for example, by brightening the character indicating part 82 and the transmittable margin 84.

Figure 7:
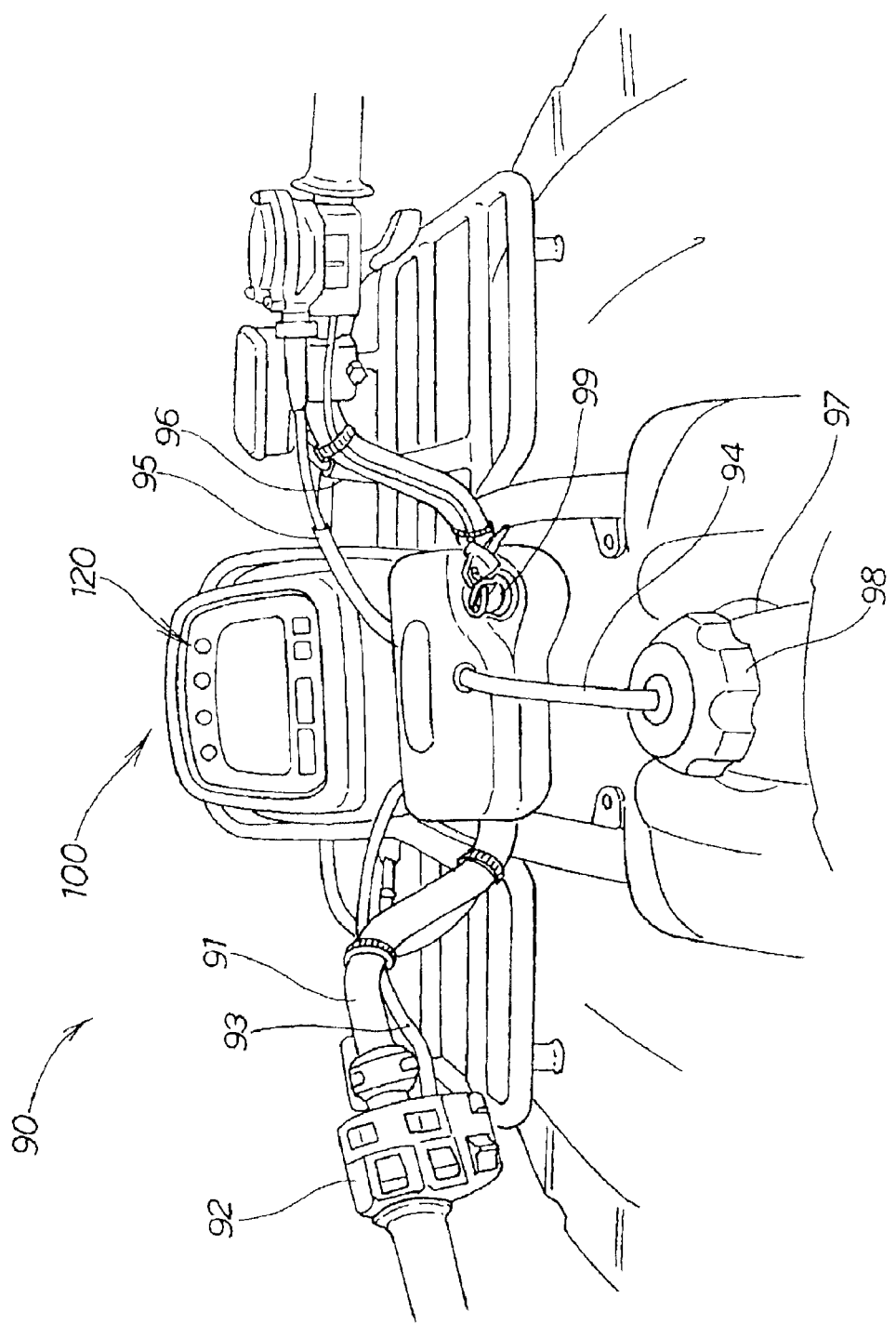
FIG. 7 is a perspective view showing a saddle-type vehicle mounting an indicator equivalent to further another embodiment of the invention.

FIG. 7 is a perspective view showing a saddle-type vehicle in which an indicator equivalent to further another embodiment of the invention is mounted. FIG. 7 shows the saddle-type vehicle 90, a handlebar 91, a handlebar switch 92, a handlebar switch cord 93, a fully-capped breather tube 94, a choke cable 95, a front brake hose 96, a fuel tank 97, a tank cap 98, an engine key 99, and a vehicular meter 100.

The vehicular meter 100 is a meter mounting an indicator 120 for four-wheel-drive indication which can indicate a graphic form clearly both in the daytime and at night, as described later.

Figure 8:
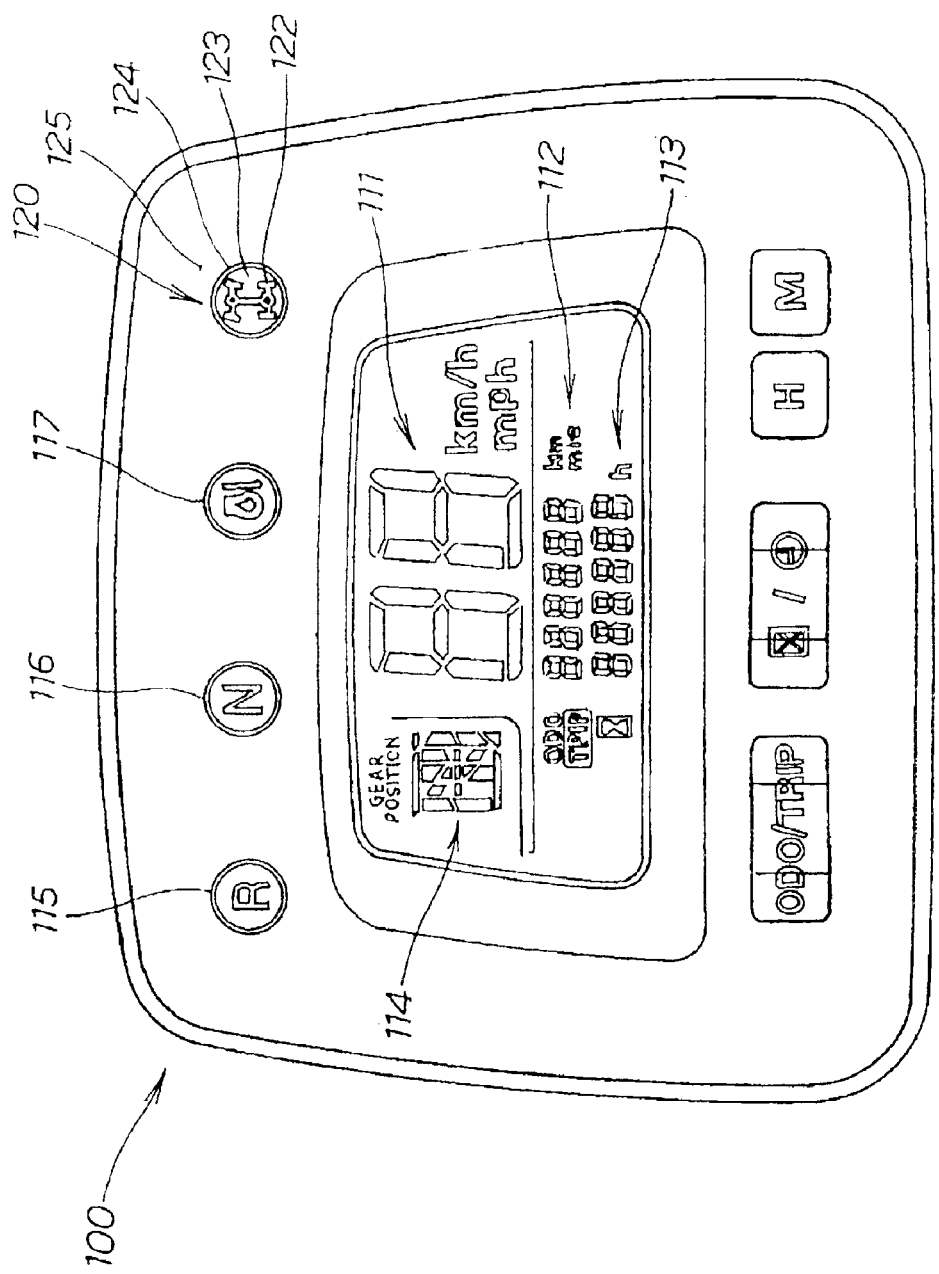
FIG. 8 is a plan showing a vehicular meter mounting an indicator equivalent to furthermore another embodiment of the invention.
Figure 9A:
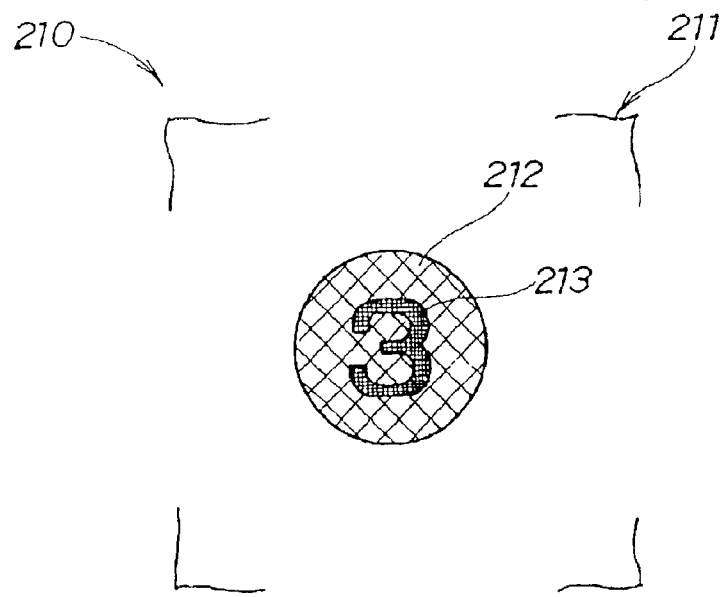
FIGS. 9 (a) and (b) are explanatory drawings for explaining a conventional type indicator.
Figure 9B:
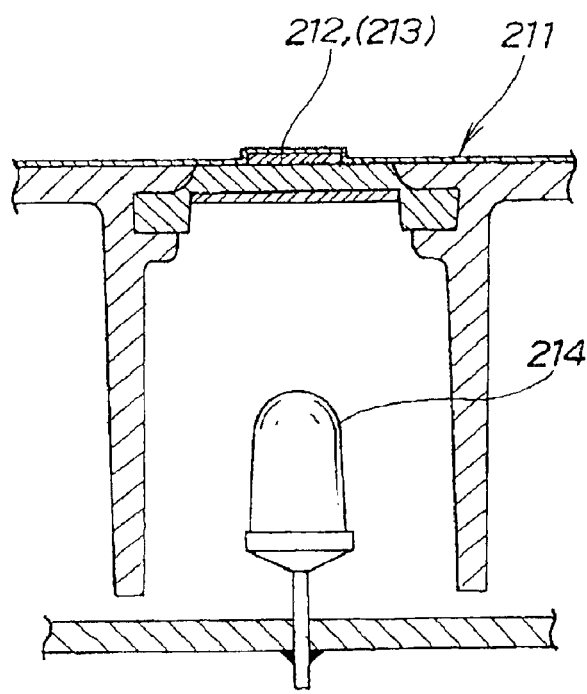

FIG. 8 is a plan showing a vehicular meter mounting an indicator equivalent to still another embodiment of the invention. FIG. 8 shows a speedometer 111, a trip odometer 112 that indicates the mileage of a vehicle, a clock 113 that indicates time, a gear position meter 113 that indicates the gear position of a transmission (not shown), a reverse indicator 115, a neutral indicator 116, a temperature rise indicator 117, and an indicator 120 for four-wheel-drive indication. The indicator for four-wheel-drive indication 120 has the same structure as the indicator 80 shown in FIGS. 6(*a*) and (*b*).

FIG. 8 shows a graphic form indicating part 122, a masking part 123, a transmittable margin 124, and a peripheral area 125. The indicator for four-wheel-drive indication 120 is an indicator that can indicate the graphic form indicating part 122 clearly both in the daytime and at night.

In the embodiment described above, the character indicating part 62 indicates the character D as shown in FIGS. 4(*a*) and (*b*). However, the invention is not limited to this, and an indicated character may be also a graphic form or the combination of a character and a graphic form.

In the embodiment described above, the indicator 50 of the vehicular meter 40 of the saddle-type vehicle 10 is described as shown in FIG. 1. However, the invention is not particularly limited to an indicator of a vehicle. That is, the invention may be also applied to a general signboard and electronic equipment.

Further, in the embodiment described above, the transmittable margin 64 is provided with the diamond-cut face 77 as shown in FIGS. 4(a) and (b). However, the invention is not limited to the diamond-cut face, and includes means for increasing brightness utilizing the reflection of light such as a crystal face of crystal.

In the embodiment described above, the peripheral area 65 of the indicator panel 61 is processed so that the area is solid in black as shown in FIGS. 4(a) and (b). However, the invention is not limited to a solid state in black, and also, the peripheral area may be another solid color. The peripheral area may be also made to transmit light. In this case, the peripheral area may include printing that is solid black or another color, and combined with a process for transmitting light.

In the embodiment described above, the mat face 76 and the diamond-cut face 77 are formed on the light transmitting plate 69 as shown in FIGS. 4(a) and (b). However, the invention is not limited to this and the faces may be also directly formed on the indicator panel.

The invention produces the following effect owing to the configuration described above.

According to the first aspect of the invention, since the indicator panel includes the character indicating part that indicates a character or a graphic form and transmits light, the masking part that intercepts light by surrounding the character indicating part and the transmittable margin that surrounds the masking part and transmits light, the area of the part for transmitting light from the light source in the indicator panel can be limited.

Hereby, the character or the graphic form of the indicator panel is conspicuous in the daytime, whereas at night, it is never more conspicuous than required. As a result, the visibility of the indicator can be improved.

According to the second aspect of the invention, the character indicating part that indicates a character or a graphic form can be made conspicuous by providing the mat face for softening light to be transmitted to the back of the character indicating part, and the character or the graphic form can be accented by providing the diamond-cut face for increasing brightness by irregularly reflecting light to be transmitted to the back of the transmittable margin. As a result, the design of the indicator can be enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An indicator for indicating a character or a graphic form, comprising:
   a light source provided in a housing for irradiating the character or the graphic form; and
   a transmittable indicator panel attached to the housing, the transmittable indicator panel including:
     a character indicating part that indicates a character or a graphic form and intercepts light;
     a masking part that intercepts light by surrounding the character indicating part; and
     a transmittable margin that completely surrounds an outer perimeter of the masking part and transmits light therethrough.

2. The indicator according to claim 1, further comprising:
   a mat face that softens light transmitted to the back of the character indicating part; and
   a diamond-cut face or a crystal face for increasing brightness by irregularly reflecting light transmitted to the back of the transmittable margin.

3. The indicator according to claim 1, wherein the housing is arranged under the transmittable indicator panel.

4. The indicator according to claim 1, further comprising:
   a light transmitting plate attached to an opening on the upper surface of the housing; and
   a board supporting the light source arranged in an opening of the lower surface of the housing.

5. The indicator according to claim 1, further comprising:
   a peripheral area of the transmittable indicator panel, the peripheral area being a part that intercepts light by printing, the part being solid black or another solid color.

6. The indicator according to claim 1, further comprising:
   a peripheral area of the transmittable indicator panel, the peripheral area being a part that partially intercepts light by printing, the part being black or another color.

7. The indicator according to claim 1, wherein the transmittable margin rises higher above a light transmittable plate than does the masking part.

8. The indicator according to claim 1, wherein the character or the graphic form is a letter, a numeral, a symbol, or a combination thereof.

9. The meter according to claim 1, wherein the transmittable margin is circular-shaped.

10. The meter according to claim 1, wherein a diameter of a central opening of the transmittable margin is smaller than an outer diameter of the masking part.

11. A meter for a vehicle, comprising:
    a meter housing with a cover; and
    a plurality of indicators for indicating a character or a graphic form, each of the plurality of indicators comprising:
      a light source provided in a housing for irradiating the character or the graphic form;
      a transmittable indicator panel attached to the housing, the transmittable indicator panel including:
        a character indicating part that indicates a character or a graphic form and transmits light;
        a masking part that intercepts light by surrounding the character indicating part; and
        a transmittable margin that surrounds the masking part and transmits light,
        wherein the transmittable margin rises higher above a light transmittable plate than does the masking part.

12. The meter according to claims 11, further comprising:
    a mat face that softens light transmitted to the back of the character indicating part; and
    a diamond-cut face or a crystal face for increasing brightness by irregularly reflecting light transmitted to the back of the transmittable margin.

13. The meter according to claim 11, wherein the housing is arranged under the transmittable indicator panel.

14. The meter according to claim 11, further comprising:
    a light transmitting plate attached to an opening on the upper surface of the housing: and
    a board supporting the light source arranged in an opening of the lower surface of the housing.

15. The meter according to claim 11, further comprising:
    a peripheral area of the transmittable indicator panel, the peripheral area being a part that intercepts light by printing, the part being solid black or another solid color.

16. The meter according to claims 11, further comprising:
    a peripheral area of the transmittable indicator panel, the peripheral area being a part that partially intercepts light by printing, the part being black or another color.

17. The meter according to claim 11, wherein the character or the graphic form is a letter, a numeral, a symbol, or a combination thereof.

18. An indicator for indicating a character or a graphic form, comprising:
   a light source provided in a housing for irradiating the character or the graphic form; and
   a transmittable indicator panel attached to the housing, the transmittable indicator panel including:
      a character indicating part that indicates a character or a graphic form and transmits light;
      a masking part that intercepts light by surrounding the character indicating part; a transmittable margin that surrounds the masking part and transmits light;
      a mat face that softens light transmitted to the back of the character indicating part; and
      a diamond-cut face or a crystal face for increasing brightness by irregularly reflecting light transmitted to the back of the transmittable margin.

* * * * *